United States Patent
Hermann et al.

(10) Patent No.: US 8,133,608 B2
(45) Date of Patent: Mar. 13, 2012

(54) BATTERY PACK WITH CELL-LEVEL FUSING

(75) Inventors: Weston Arthur Hermann, Palo Alto, CA (US); Scott Ira Kohn, Redwood City, CA (US); Paul Bryan Kreiner, Los Altos Hills, CA (US); Christopher David Gadda, Sunnyvale, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 99 days.

(21) Appl. No.: 12/850,282

(22) Filed: Aug. 4, 2010

(65) Prior Publication Data
US 2012/0034497 A1 Feb. 9, 2012

(51) Int. Cl.
*H01M 2/26* (2006.01)
*H01M 2/24* (2006.01)
*H01M 10/50* (2006.01)
*H02J 7/00* (2006.01)

(52) U.S. Cl. ........ 429/161; 429/120; 429/160; 320/118; 320/133; 320/134

(58) Field of Classification Search .................. 429/160, 429/161, 120; 320/118, 134, 162
See application file for complete search history.

(56) References Cited

U.S. PATENT DOCUMENTS

| | | | |
|---|---|---|---|
| 6,099,986 A | | 8/2000 | Gauthier et al. |
| 6,291,972 B1 * | | 9/2001 | Zhang ........................... 320/118 |
| 2002/0086578 A1 * | | 7/2002 | Ikeda ........................... 439/500 |
| 2005/0029867 A1 * | | 2/2005 | Wood ........................... 307/10.1 |
| 2005/0233210 A1 | | 10/2005 | Horie et al. |
| 2007/0145950 A1 * | | 6/2007 | Wang ........................... 320/134 |
| 2007/0188147 A1 | | 8/2007 | Straubel et al. |
| 2009/0167312 A1 * | | 7/2009 | Keates et al. .................. 324/434 |

FOREIGN PATENT DOCUMENTS

JP 6 223815 8/1994

OTHER PUBLICATIONS

Extended European Search Report for co-pending European patent application that corresponds to U.S. Appl. No. 12/850,282.

* cited by examiner

*Primary Examiner* — Patrick Joseph Ryan
*Assistant Examiner* — Muhammad Siddiquee
(74) *Attorney, Agent, or Firm* — Patent Law Office of David G. Beck

(57) ABSTRACT

A battery pack, or battery pack module, is provided that achieves improved battery pack performance, system reliability and system safety while impacting only a small region of the battery pack/battery module, and thus having only a minor impact on battery pack cost, complexity, weight and size. The battery pack/battery module is designed such that the fusible interconnects associated with a single battery, or a specific fusible interconnect associated with a single battery, will be the last interconnect(s) to fuse during a short circuit event. The risk of sustained arcing for the predetermined interconnect(s) is minimized through the use of rapid clearing interconnects. As a result, the risk of damage and excessive heating is also minimized.

27 Claims, 6 Drawing Sheets

BATTERY PACK WITH CELL-LEVEL FUSING

FIELD OF THE INVENTION

The present invention relates generally to battery packs and, more particularly, to a battery pack that is designed to mitigate the effects of arcing during a short circuit.

BACKGROUND OF THE INVENTION

Arcing is a well-known phenomena that results when the current in an electrical circuit is interrupted, wherein an arc is formed across the newly created gap in the circuit. If the arc is not quickly extinguished, for example by containment, cooling, insufficient voltage/current, etc., the intense heat generated by the arc may damage, if not combust, nearby materials and components. Accordingly, special precautions must be taken in the design of switches, relays, fuses and circuit breakers that are intended for use in high-power circuits. It is more difficult, however, to control unintended circuit interruptions that nevertheless may occur due to an inadvertent abusive situation (e.g., tool dropped on a battery pack; battery pack dropped; car crash which causes damage to the battery pack, etc.).

In a typical battery pack, fuses are used to mitigate the effects of an inadvertent short circuit. In some instances, the fuse is placed in series with one, or both, interconnects that couple the battery pack to the load (FIG. 1). If the battery pack includes a plurality of cells as illustrated in FIG. 2, the battery pack may still rely on a single fuse as shown in FIG. 1, or each cell may be connected via its own fuse or fusible interconnect as shown in FIG. 2.

Regardless of the approach used to provide circuit protection, it is desirable that the fusing element(s) of the circuit fuse quickly enough to avoid damage or excessive heating of adjacent cells/components. This is especially desirable in battery packs utilizing a large number of cells packed closely together as excessive heating may quickly initiate thermal runaway in one or more cells. During a thermal runaway event, a large amount of thermal energy is rapidly released, heating the entire cell up to a temperature of 900° C. or more. Due to the increased temperature of the cell undergoing thermal runaway, the temperature of adjacent cells within the battery pack will also increase, an effect that is exacerbated by the close packing of cells in a large battery pack. If the temperature of these adjacent cells is allowed to increase unimpeded, they may also enter into a state of thermal runaway, leading to a cascading effect that may propagate throughout the entire battery pack. As a result, not only is power from the battery pack interrupted, but the system employing the battery pack is more likely to incur extensive collateral damage due to the scale of thermal runaway and the associated release of thermal energy.

In a battery pack in which the cells are connected in parallel, as illustrated in FIG. 2, when a short circuit occurs it is distributed among all of the cells. As a result, typically the fuses/fusible interconnects will blow one after another until all of the fuses/fusible links have blown. The order in which these fuses/fusible links blow will depend upon minor variations between each fuse/fusible interconnect, such as differences in thermal mass, electrical impedance, etc. The last fuse/fusible interconnect within the group of cells is the fuse/fusible interconnect that is most likely to arc. In a conventional battery pack, as the order in which the fuses/fusible interconnects blow is not controlled, each fuse/fusible interconnect must be designed to minimize the risk of arcing, or other means must be employed to mitigate the potential effects of arcing. This approach, however, leads to increased cost, complexity and weight, all of which may be quite significant in large battery packs such as those employed in hybrid and all-electric vehicles. Accordingly, what is needed is a means of minimizing the risks associated with arcing within a battery pack, while not significantly impacting battery pack manufacturing cost, complexity and weight. The present system provides such a means.

SUMMARY OF THE INVENTION

The present invention provides a battery pack, or battery pack module, that achieves improved battery pack performance, system reliability and system safety while impacting only a small region of the battery pack/battery module, and thus having only a minor impact on battery pack cost, complexity, weight and size. The battery pack/battery module is designed such that the fusible interconnects associated with a single battery, or a specific fusible interconnect associated with a single battery, will be the last interconnect(s) to fuse during a short circuit event. The risk of sustained arcing for the predetermined interconnect(s) is minimized through the use of rapid clearing interconnects. As a result, the risk of damage and excessive heating is also minimized.

In one aspect of the invention, a battery pack short circuit management system is provided that includes (i) a plurality of cells electrically connected to first and second collector plates, where the first and second cell terminals of all of the cells, except one, are connected to the first and second collector plates with first and second pluralities of fusible interconnects, respectively, (ii) a first fusible interconnect electrically connecting the first cell terminal of the remaining cell to the first collector plate and a second fusible interconnect electrically connecting the second cell terminal of the remaining cell to the second plate, and (iii) an arc suppression system corresponding to at least one of the first and second fusible interconnects. Additionally, the impedance of the first fusible interconnect is lower than that of the first and second pluralities of fusible interconnects and the impedance of the second fusible interconnect is lower than that of the first and second pluralities of fusible interconnects. The impedance of the first and second fusible interconnects may be substantially the same, in which case the arc suppression system corresponds to both the first and second fusible interconnects, or the impedance of the first fusible interconnect may be lower than that of the second fusible interconnect, in which case the arc suppression system is preferably limited to the first fusible interconnect. The impedance of the interconnects (i.e., first fusible interconnect, second fusible interconnect, first plurality of interconnects, second plurality of interconnects) may be selected/varied by controlling the length, thickness, or composition of the interconnects, or by varying the number of interconnects used for a particular cell connection. The arc suppression system may be comprised of (i) an electrically non-conductive isolation structure; or (ii) utilize a capacitor connected in parallel with the preselected interconnect; or (iii) utilize the combination of a thyristor in series with a PTC element, the combination connected in parallel with the preselected interconnect; or (iv) utilize a permanent magnet; or (v) utilize a contact block separate from the cell and collector plate, where the preselected interconnect connects the cell to the contact block and a secondary interconnect with a lower impedance connects the contact block to the collector plate. The battery pack short circuit management system may further include a thinned interconnect contact region that extends away from the collector plate. The battery pack short circuit management system may further include an electrically non-conductive, thermally insulating structure that separates the cell from the rest of the cells.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. The terms "electrical impedance" and "impedance" may be used interchangeably herein with both terms referring to the electrical impedance of the component in question. The term fusible interconnect as used herein refers to battery interconnect, typically a wire bond, that is designed to allow the expected current to pass without significant heating, but which will fuse in an overcurrent condition such as would be expected during a short circuit. Such a fusible interconnect is described in detail in co-assigned U.S. Pat. No. 7,671,565, the disclosure of which is incorporated herein for any and all purposes. It should be understood that identical element symbols used on multiple figures refer to the same component, or components of equal functionality. Additionally, the accompanying figures are only meant to illustrate, not limit, the scope of the invention and should not be considered to be to scale.

In accordance with the invention, a battery pack, or battery pack module, is designed so that a particular set of cell interconnects will fuse last during a short circuit event. The risk of sustained arcing for the predetermined interconnect(s) may then be minimized through the use of rapid clearing interconnects. As a result, the risk of damage, excessive heating, and the potential for thermal runaway, is also minimized. As described in detail below, there are many ways to predetermine which interconnect or set of interconnects will fuse last, and many ways to minimize the risk of sustained arcing in this predetermined interconnect(s).

Figure 1:
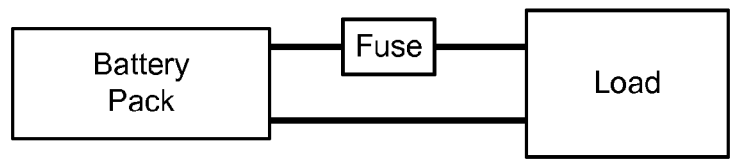
FIG. 1 illustrates a battery pack utilizing a fuse in the interconnect between the battery pack and the load in accordance with the prior art.
Figure 2:
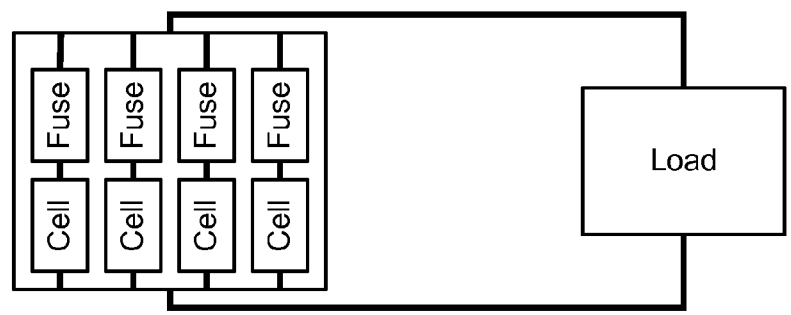
FIG. 2 illustrates a battery pack utilizing a plurality of cells connected in parallel, in which each cell is connected via an individual fuse or fusible interconnect.
Figure 3:
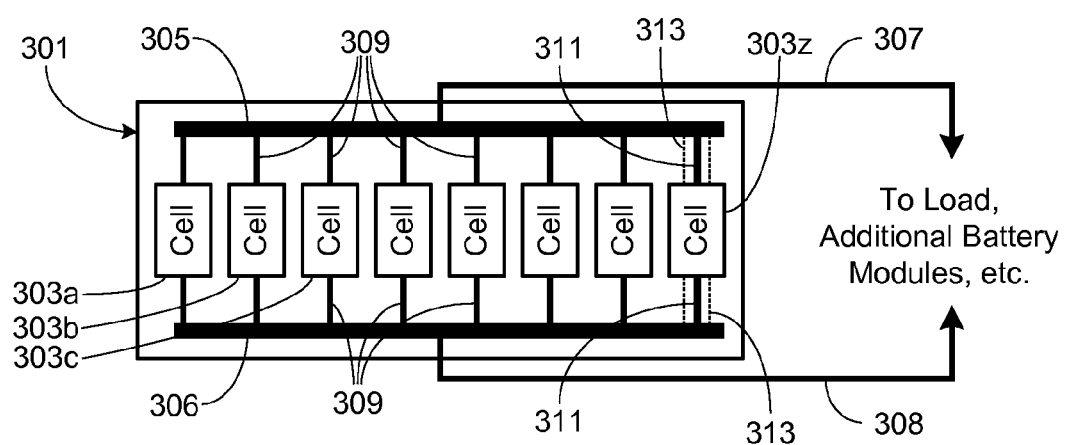
FIG. 3 provides a high-level view of a battery pack in which the fusible interconnects associated with a single cell are predetermined to fuse last.

FIG. 3 provides a high-level view of a battery pack 301 utilizing the invention. As described in further detail below, the present invention may be utilized in any group of cells that are arranged in a parallel configuration, regardless of the number of cells or whether the group of cells forms the entire battery pack or only one module of a plurality of serially interconnected battery modules. Within battery pack 301 are a plurality of cells 303a-303z that are preferably of substantially the same design, i.e., same battery chemistry, same energy density, same configuration, same voltage/current characteristics, etc. Typically each cell is electrically connected to a collector plate, e.g., collector plates 305/306. The collector plates are electrically connected to the intended load or to another battery pack module via lines 307/308. Note that a fuse may be connected to one or both lines 307 and 308, for example prior to connection with another battery pack module.

The cells are connected to the collector plates using fusible interconnects, for example fusible wire bonds, that are designed to pass the expected current, but to fuse (i.e., break) during an overcurrent condition such as would be expected during a short circuit. In accordance with one embodiment of the invention, the interconnects (i.e., interconnects 309) used to connect all of the cells, but one, have substantially the same electrical and thermal characteristics. As a result, and similar to a conventional battery pack, the order in which interconnects 309 fuse during a short circuit event is unpredictable as the order will be determined by minor interconnect variations that arise during manufacturing, for example, minor variations in interconnect thickness, cross-section, etc. In this embodiment, one of the cells, e.g., cell 303z in FIG. 3, is electrically connected to collector plates 305/306 with interconnects 311, interconnects 311 being designed to be the last set of interconnects to fuse during a short circuit event. To insure that interconnects 311 fail after all of the other cells' interconnects, i.e., interconnects 309, interconnects 311 have a lower electrical impedance than the other interconnects. To achieve a lower electrical impedance, interconnects 311 may have a slightly different material composition, or they may be thicker or shorter than the other interconnects. Alternately, interconnects 311 may be formed from multiple individual interconnects 309, thereby achieving the desired impedance. A number of techniques may be used to minimize arcing when interconnects 311 fuse, these techniques represented in FIG. 3 by shielding 313 shown surrounding interconnects 311.

As previously noted, by designating a particular interconnect or pair of interconnects to be the last to fail during a short circuit event, the risk of sustained arcing may be minimized while requiring only minor changes to the overall design of the battery pack or battery module. In particular, only the designated interconnect(s) and potentially the region surrounding the designated interconnect(s) must be designed to minimize arcing. As a result, improved battery pack performance, system reliability and system safety may all be achieved while impacting only a small region of the battery pack/battery module, and thus having only a minor impact on battery pack cost, complexity, weight and size.

Figure 4:
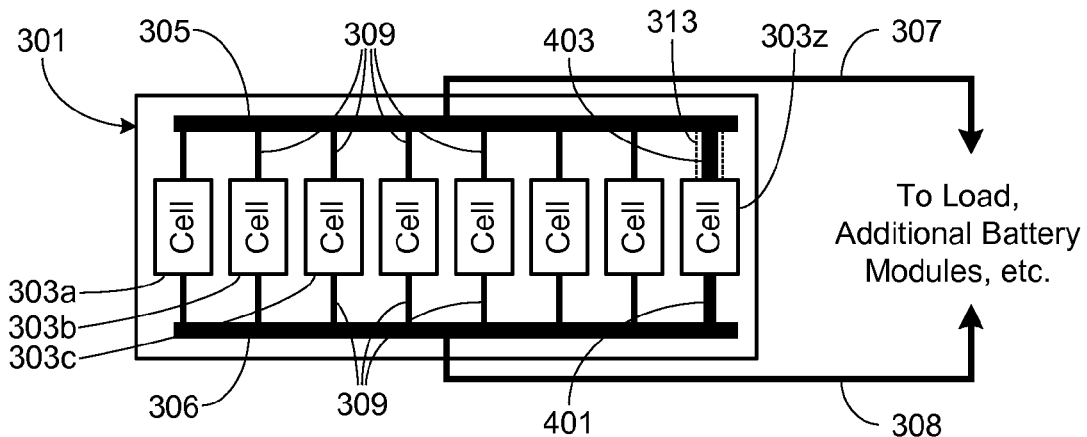
FIG. 4 illustrates a preferred embodiment in which a single interconnect is predetermined to fuse last.

As the goal of the present invention is to minimize the risk of sustained arcing while minimizing the impact on battery pack design, it will be appreciated that limiting the arcing event to a single interconnect, rather than a pair of interconnects as shown in FIG. 3, is preferable. To achieve this goal, the interconnects associated with one cell are fabricated to have a lower electrical impedance than the remaining cells in that same group of parallel-arranged cells, as described relative to FIG. 3. Additionally, and as illustrated in FIG. 4, the two low impedance interconnects, e.g., interconnects 401 and 403, have different impedances. In this example, interconnect 401 has a lower electrical impedance than interconnects 309, and interconnect 403 has a lower electrical impedance than interconnect 401. As a result, the fusible interconnects of cell 303z will be the last to fuse, and of these two interconnects, interconnect 403 will be the last to fuse. This approach allows whatever technique is applied to minimize sustained arcing, represented in FIG. 4 by shielding 313, to be limited to a single interconnect (e.g., interconnect 403), thereby potentially further reducing battery pack or battery module design complexity and cost.

It will be appreciated that there are numerous techniques that may be used to alter the impedance of a particular fusible interconnect, or a pair of interconnects, to insure that the selected interconnect(s) is the last to fuse among a group of interconnects corresponding to a group of parallel-arranged cells. FIGS. 5-11 illustrate a few of the primary techniques that the inventors have found especially suitable for use with the invention. Note that while FIGS. 5-11 only show three cells arranged in parallel, these techniques are equally suitable for use with both smaller and larger groups of cells. Additionally, as FIGS. 5-11 are only meant to illustrate different techniques that may be used to alter the impedance of a particular set of interconnects, it will be understood that these techniques may be used with any of a variety of arc minimizing techniques as described in further detail in a different portion of this specification.

In FIGS. 5-11, three cells 501a-501c are shown electrically connected to a pair of collector plates 503/504. In these illustrations, the interconnect(s) associated with cells 501a and 501b are designed to fuse before the interconnects associated with cell 501c.

Figure 5:
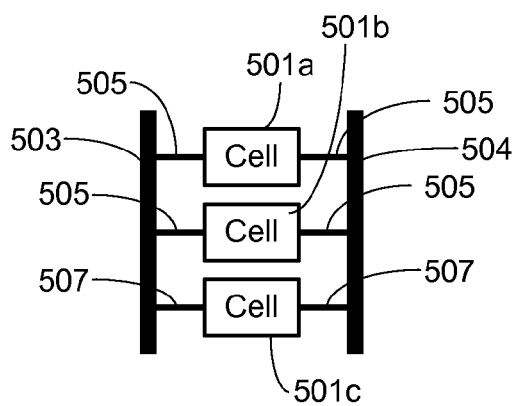
FIG. 5 illustrates controlling the interconnect composition in order to control interconnect impedance.

In FIG. 5, cells 501a and 501b are electrically connected to collector plates 503/504 via fusible interconnects 505 while cell 501c is electrically connected to collector plates 503/504 via fusible interconnects 507. In this embodiment, the composition of interconnects 505 and 507 are different, the composition selected for interconnects 507 having a lower impedance than the material selected for interconnects 505. For example, assuming the use of aluminum-copper wire bonds for the interconnects, the copper concentration in wire bonds 507 may be increased in order to achieve the desired lower impedance.

Figure 6:
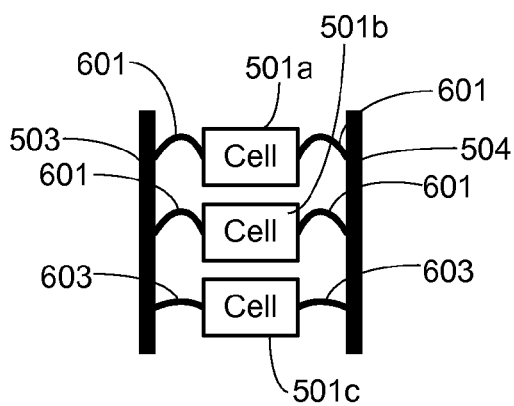
FIG. 6 illustrates controlling the interconnect length in order to control interconnect impedance.

In FIG. 6, the desired difference in impedance between interconnects 601 and 603 is achieved by varying interconnect length. As illustrated, interconnects 601 are longer than interconnects 603, thus providing a lower impedance for interconnects 603.

Figure 7:
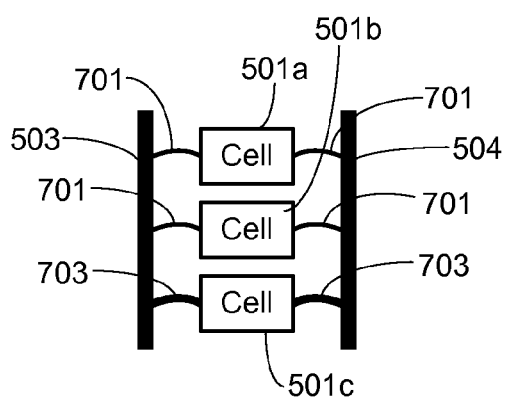
FIG. 7 illustrates controlling the interconnect thickness in order to control interconnect impedance.

In FIG. 7, the desired difference in impedance between interconnects 701 and 703 is achieved by varying interconnect thickness. As illustrated, interconnects 703 are thicker than interconnects 701, thus providing a lower impedance for interconnects 703.

Figure 8:
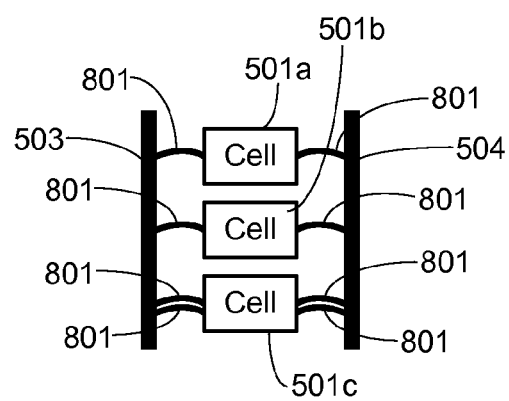
FIG. 8 illustrates controlling interconnect impedance by controlling the number of interconnects coupling each cell to the collector plate.

In FIG. 8, the desired difference in impedance is achieved by using multiple interconnects on cell 501c, thus providing lower impedance. As illustrated, cells 501a and 501b each use a single interconnect 801 on either cell side to connect to collector plates 503 and 504, while cell 501c uses a pair of interconnects 801 on either cell side to connect to the collector plates.

Figure 9:
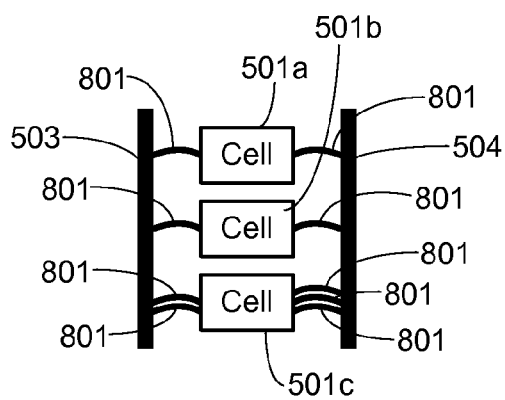
FIG. 9 illustrates a variation of the embodiment shown in FIG. 8.
Figure 10:
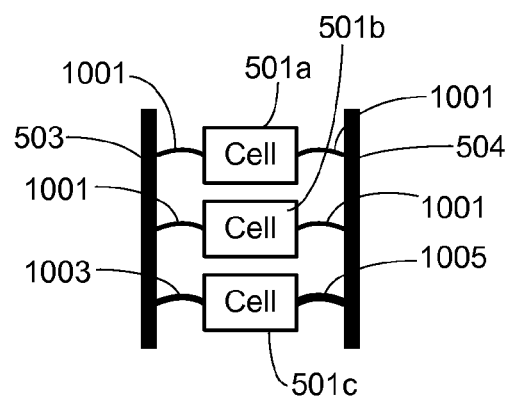
FIG. 10 illustrates a variation of the embodiment shown in FIG. 7.

While FIGS. 5-8 illustrate a pair of interconnects of different impedance than the remaining interconnects, these same techniques may be used to vary the impedance between the two interconnects comprising the selected pair of interconnects in order to predefine which specific interconnect will fuse last, as described relative to FIG. 4. For example, the embodiment shown in FIG. 9 utilizes the techniques illustrated in FIG. 8, and the embodiment shown in FIG. 10 utilizes the techniques illustrated in FIG. 7. In FIG. 9, the side of cell 501c coupled to collector plate 503 uses two interconnects 801 while the side of cell 501c coupled to collector plate 504 uses three interconnects 801. As the impedance of the three interconnects will be less than that of the two interconnects, the interconnects on the right side of cell 501c will be the last to fuse. Similarly, in FIG. 10, interconnect 1005 is thicker than interconnect 1003, and interconnect 1003 is thicker than remaining interconnects 1001. As a result, interconnect 1005 will be the last to fuse during a short circuit. It will be appreciated that any of the techniques used to control interconnect impedance may be used to predefine the last interconnect to fuse.

Figure 11:
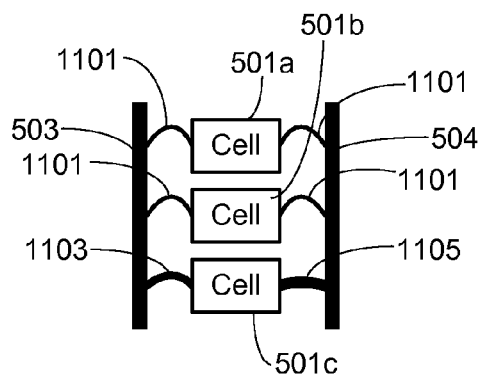
FIG. 11 illustrates controlling the interconnect impedance using a combination of multiple impedance controlling techniques.
Figure 12:
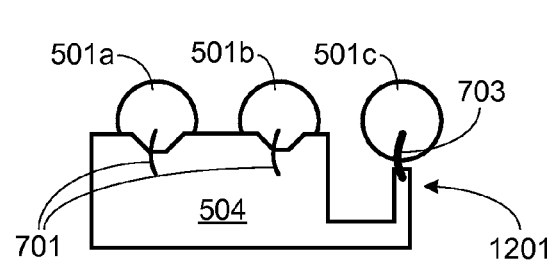
FIG. 12 illustrates a technique for extinguishing the arc using a narrow current collector pathway.
Figure 13:
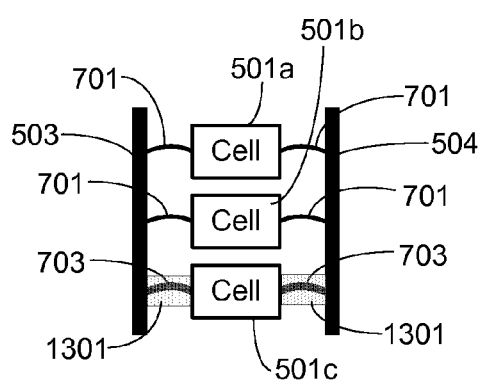
FIG. 13 illustrates a technique for extinguishing the arc in which the interconnect(s) is positioned within an isolated, non-conductive region that cannot support arc growth.

In addition to varying the interconnect composition or dimensions as described above in order to control interconnect impedance, it should be understood that any of these techniques may also be used in combination with one another. For example, to achieve the desired impedance, both the thickness and length may be varied as illustrated in FIG. 11. As shown, interconnect 1103 is shorter and thicker than interconnects 1101, thus lowering its relative impedance. Similarly, interconnect 1105 is shorter and thicker than interconnect 1103, causing it to be the last interconnect to fuse during a short circuit.

As previously described, in addition to predetermining which cell interconnect(s) will fuse last during a short circuit event, the present invention utilizes a fusible interconnect and/or interconnect configuration that rapidly extinguishes any arcing that may occur when the last interconnect fuses. By reducing the risk of sustained arcing, the risk of collateral damage, excessive heating, and the potential for thermal runaway, is minimized. It will be appreciated that there are numerous applicable techniques that may be used to provide an interconnect that clears rapidly during fusing, therefore FIGS. 12-21 are only meant to illustrate, not limit, this aspect of the invention. As in FIGS. 5-11, only a small number of cells are used for illustration purposes, even though the invention is clearly applicable to battery packs and battery pack modules consisting of fewer or greater numbers of parallel-arranged cells. While FIGS. 12-21 are shown using fusible interconnects of varying thickness to predetermine the interconnect that will fuse last, it should be understood that any of the techniques for rapidly extinguishing an arc may be used with any of the techniques for predetermining which interconnect or interconnects will fuse last. Although, in FIGS. 12-21 both interconnects associated with a specific cell are preselected to fuse last, it will be appreciated that these techniques may also be used when a single interconnect is preselected to fuse last, for example as described relative to FIGS. 9-11.

FIGS. 12-21 are based on the configuration shown in FIG. 7 in which three cells 501*a*-501*c* are electrically connected to a pair of collector plates 503/504. As previously noted, the impedance of interconnect 703 is designed to be lower than the impedance of interconnects 701, thus causing fusible interconnects 701 to fuse before interconnect 703.

One method of extinguishing the arc that may form when the last interconnect fuses is to design the collector plate and any surrounding conductive regions in such a way that the newly formed arc cannot be sustained, thus causing the arc to be extinguished before excessive damage may occur. For example, in the embodiment illustrated in FIG. 12, collector plate 504 includes a relatively narrow region 1201 of material onto which the fusible interconnect 703 is attached. While the collector pathway provided by region 1201 is designed to provide sufficient current carrying capacity for normal battery pack operation, when interconnect 703 fuses region 1201 is thin enough to quickly ablate away. Assuming that there are not any conductive structures mounted close by, the rapid ablation of region 1201 will quickly extend the arc path to a sufficient degree to extinguish the arc.

Figure 14:
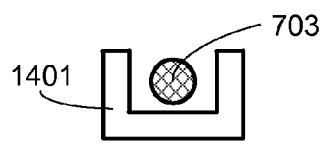
FIG. 14 provides a cross-sectional view of a non-conductive channel applicable to the technique illustrated in FIG. 13.
Figure 15:
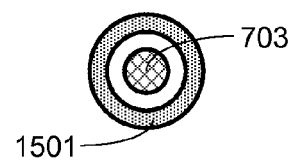
FIG. 15 provides a cross-sectional view of a non-conductive tube applicable to the technique illustrated in FIG. 13.

Another method of rapidly extinguishing the arc is to locate the interconnect in an isolated, non-conductive region that cannot support arc growth. In this approach, illustrated in FIG. 13, the conductive structures at either end of the interconnect, i.e., cell 501*c* and collectors 503/504, must be sufficiently separated that the arc will self-extinguish once the interconnect within isolator structure 1301 fuses. Isolator structure 1301 may be formed by encasing the interconnect in a non-conductive material, preferably after the interconnect has been attached, for example via wire bonding, to the cell and collector plate. Any of a variety of well-known, non-conductive materials may be used for this purpose, such as a non-conductive epoxy, adhesive, or potting compound. Alternately, the interconnect may be isolated by placing it within a non-conductive channel or tube. A cross-sectional view of a non-conductive channel 1401 is shown in FIG. 14 and a cross-sectional view of a non-conductive tube 1501 is shown in FIG. 15. It will be appreciated that the exact configuration, including the shape of the isolator, depends on the battery pack/module configuration, including the relative locations of the cell and the collector, and therefore these figures are only meant to illustrate this approach.

Figure 16:
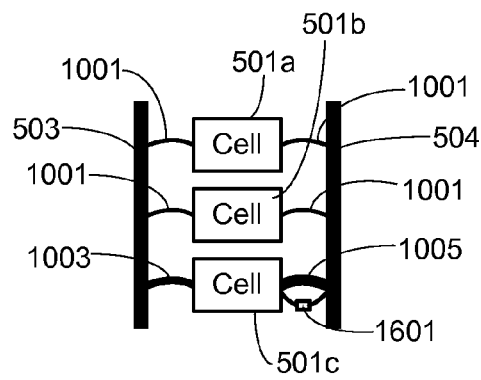
FIG. 16 illustrates a technique for extinguishing the arc using a capacitor.

Another approach that may be used to extinguish the arc formed when the last interconnect fuses is illustrated in FIG. 16. In this approach a capacitor is placed in parallel with the interconnect or interconnects preselected to be the last to fuse. While this approach may be used when a pair of interconnects is preselected, e.g., FIGS. 5-8, preferably it is used when a single interconnect is preselected, e.g., FIGS. 9-11, thus minimizing both cost and manufacturing complexity. Accordingly, in the exemplary embodiment shown in FIG. 16, the interconnect on the right side of cell 501*c* is preselected to fuse last. Although preselection in this embodiment is achieved by controlling interconnect thickness as described above relative to FIG. 10, it will be understood that the other disclosed techniques may also be used to vary the interconnect impedance and preselect a single interconnect to fuse last.

In parallel with interconnect 1005 is a high voltage capacitor 1601 that is selected based on the expected operating voltage of the cells within this group of cells. As the interconnect fuses and the voltage begins to rise, and assuming the impedance of the capacitor is similar to or lower than the arc path, the capacitor will draw current away from the arc, thereby effectively extinguishing the arc. For example, assuming a 280 volt internal pack short with an arc that is sustained at 100 amps for 25 milliseconds, approximately 2.5 coulombs of charge pass through the arc. Therefore a 200 volt, 12.5 millifarad or less capacitor can be used in this example to mitigate the arc power so that the arc is not sustained.

Figure 17:
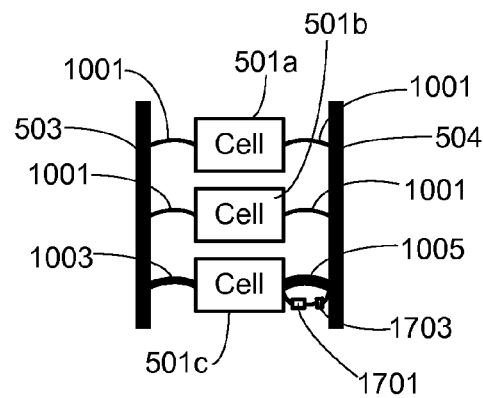
FIG. 17 illustrates a technique for extinguishing the arc using a thyristor and a PTC element.

FIG. 17 illustrates a variation of the previously described technique for extinguishing the arc formed when the last interconnect fuses. In this embodiment, capacitor 1601 is replaced with a thyristor 1701 in series with a high voltage, positive temperature coefficient (PTC) element 1703. While a thyristor is preferred in this approach, it should be understood that thyristor 1701 may be replaced with other components that exhibit decreased resistance at high voltage. In the illustrated embodiment, as the interconnect fuses and the voltage begins to rise, thyristor 1701 becomes conductive, allowing energy to flow into PTC element 1703. Once PTC 1703 becomes hot enough, it trips, and the arc created by the fused interconnect is extinguished. It will be appreciated that while PTC element 1703 is shown adjacent to cell 501*c*, it may need to be thermally isolated in order to insure that it is not accidently tripped due to the high operating temperatures of the cells.

Figure 18:
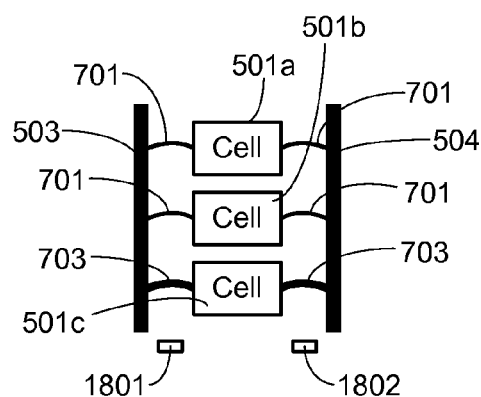
FIG. 18 illustrates a technique for extinguishing the arc using a permanent magnet to extend the arc length.

As described above, one approach to extinguishing the arc formed when the interconnect fuses is to extend the arc length to a sufficient degree that it cannot be sustained. This approach is the basis for the embodiment illustrated in FIG. 12. FIG. 18 illustrates another embodiment based on this same approach, but utilizing different means to extend the arc length. As shown, permanent magnets 1801/1802 are positioned close to each fusible interconnect 703 that has been preselected to fuse last. It will be appreciated that if the battery pack/module is configured to have a single interconnect preselected to fuse last, as described above relative to FIGS. 9-11, then only a single magnet is required.

In the embodiment illustrated in FIG. 18, when the interconnect fuses, the arc that is formed is attracted to the adjacent permanent magnet, e.g., magnet 1801 or 1802. This attraction changes the arc path of the newly formed arc. By locating the magnet some distance away from the interconnect, and locating the magnet(s) so that it does not pull the arc towards other conductive surfaces/structures, the arc length is quickly extended, making it difficult for the arc to be sustained.

Figure 19:
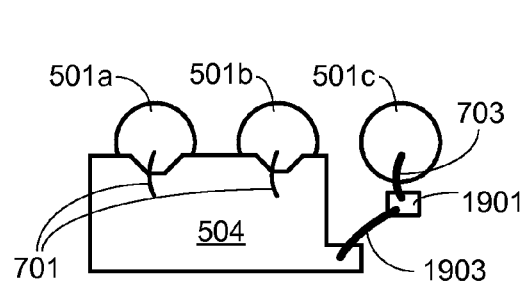
FIG. 19 illustrates a technique for extinguishing the arc using a contact block and a secondary interconnect.

In another embodiment illustrated in FIG. 19, the preselected fusible interconnect connects the cell terminal to an electrically isolated contact block 1901. A secondary fusible interconnect 1903 connects contact block 1901 to collector plate 504. The impedance of interconnect 1903 is lower than 703. As a result, while interconnect 703 will be the last cell interconnect to fuse, once it fuses and an arc is formed, interconnect 1903 will fuse, thereby extending the arc length and extinguishing the arc. Note that while interconnect 1903 is preferably a fusible interconnect, a fuse may also be used at this location to extinguish the arc.

Figure 20:
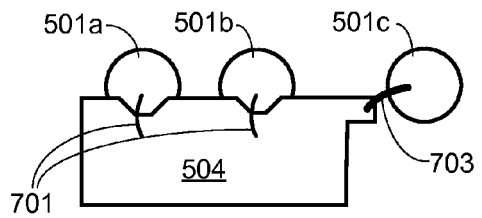
FIG. 20 illustrates a technique for thermally isolating the affected cell to avoid collateral damage to adjacent cells and structures.
Figure 21:
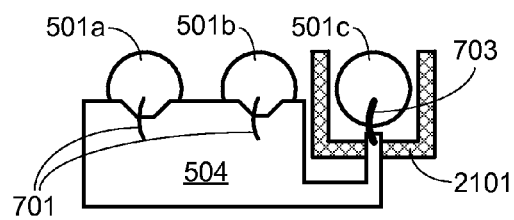
FIG. 21 illustrates an alternate technique for thermally isolating the affected cell to avoid collateral damage to adjacent cells and structures, the illustrated technique using an isolation structure.
Figure 22:
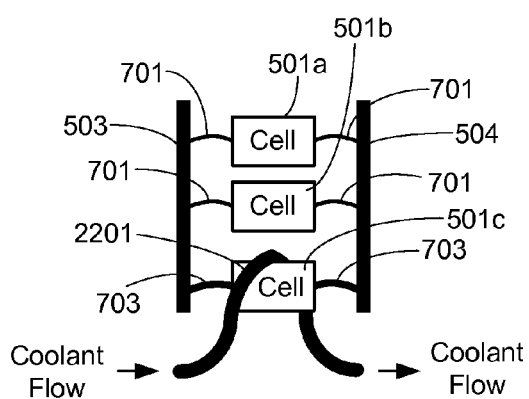
FIG. 22 illustrates an alternate technique for thermally isolating the affected cell to avoid collateral damage to adjacent cells and structures, the illustrated technique using a cooling tube wrapped around the affected cell.
Figure 23:
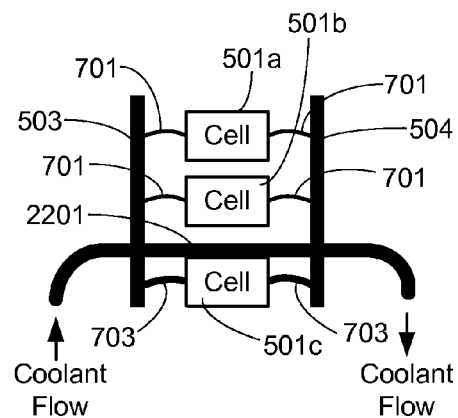
FIG. 23 illustrates an alternate technique for thermally isolating the affected cell to avoid collateral damage to adjacent cells and structures, the illustrated technique using a cooling tube to separate the affected cell from the other cells within the group.

Regardless of the technique used to extinguish the arc that is formed when the interconnect fuses, preferably one or more techniques are used to help mitigate the effects of arcing on the other cells within the battery pack/module. Techniques that may be used, either alone or in combination, include (i) providing additional space between the interconnect(s) that is preselected to fuse last along with the corresponding cell from the other cells in the group as illustrated in FIG. 20; (ii) thermally isolating the preselected interconnect(s) and the corresponding cell from the other cells as illustrated in FIG. 21, this approach using an isolation structure 2101 fabricated from a high temperature material or a thermal insulator (e.g., fabricated from ceramic); and/or (iii) providing a more extensive cooling system for the cell that corresponds to the preselected interconnect(s), for example by wrapping a cooling tube 2201 around this cell as illustrated in FIG. 22, separating the affected cell from the other cells with the cooling tube as illustrated in FIG. 23, or otherwise providing additional cooling over that provided to the other cells in the group.

As will be understood by those familiar with the art, the present invention may be embodied in other specific forms without departing from the spirit or essential characteristics thereof. For example, while the invention has been described in terms of fusible interconnects and illustrated with cylindrical cells, the invention is not so limited. Accordingly, the disclosures and descriptions herein are intended to be illustrative, but not limiting, of the scope of the invention which is set forth in the following claims.

What is claimed is:

1. A battery pack short circuit management system, comprising:
   a plurality of cells, wherein each of said cells is electrically connected to a first collector plate and a second collector plate, and wherein said plurality of cells are electrically connected in parallel;
   a first plurality of fusible interconnects electrically connecting a first terminal of each of said plurality of cells, except for a first cell, to said first collector plate;
   a second plurality of fusible interconnects electrically connecting a second terminal of each of said plurality of cells, except for said first cell, to said second collector plate;
   a first fusible interconnect electrically connecting a first terminal of said first cell of said plurality of cells to said first collector plate, wherein said first fusible interconnect is not one of said first and second pluralities of fusible interconnects, and wherein said first fusible interconnect is configured to fuse after said first plurality of fusible interconnects fuse and after said second plurality of fusible interconnects fuse;
   a second fusible interconnect electrically connecting a second terminal of said first cell of said plurality of cells to said second collector plate, wherein said second fusible interconnect is not one of said first and second pluralities of fusible interconnects, and wherein said second fusible interconnect is configured to fuse after said first plurality of fusible interconnects fuse and after said second plurality of fusible interconnects fuse; and
   an arc suppression system corresponding to at least one of said first and second fusible interconnects, wherein said arc suppression system is not utilized with said plurality of cells except for said first cell.

2. The battery pack short circuit management system of claim 1, wherein an interconnect length corresponding to said first fusible interconnect is less than an interconnect length corresponding to said first and second pluralities of fusible interconnects, and wherein an interconnect length corresponding to said second fusible interconnect is less than an interconnect length corresponding to said first and second pluralities of fusible interconnects.

3. The battery pack short circuit management system of claim 2, wherein said interconnect length corresponding to said first fusible interconnect is less than said interconnect length corresponding to said second fusible interconnect.

4. The battery pack short circuit management system of claim 1, wherein an interconnect thickness corresponding to said first fusible interconnect is greater than an interconnect thickness corresponding to said first and second pluralities of fusible interconnects, and wherein an interconnect thickness corresponding to said second fusible interconnect is greater than an interconnect thickness corresponding to said first and second pluralities of fusible interconnects.

5. The battery pack short circuit management system of claim 4, wherein said interconnect thickness corresponding to said first fusible interconnect is greater than said interconnect thickness corresponding to said second fusible interconnect.

6. The battery pack short circuit management system of claim 1, wherein said first fusible interconnect is comprised of at least two individual interconnects, wherein said second fusible interconnect is comprised of at least two individual interconnects, and wherein each fusible interconnect of said first and second pluralities of fusible interconnects is comprised of a single individual interconnect.

7. The battery pack short circuit management system of claim 6, wherein said first fusible interconnect is comprised of at least one more individual interconnect than said second fusible interconnect.

8. The battery pack short circuit management system of claim 1, wherein said first fusible interconnect and said second fusible interconnect are comprised of a first material, wherein said first and second pluralities of fusible interconnects are comprised of a second material, and wherein said first material has a lower impedance than said second material.

9. The battery pack short circuit management system of claim 1, wherein said first fusible interconnect is comprised of a first material, wherein said second fusible interconnect is comprised of a second material, wherein said first and second pluralities of fusible interconnects are comprised of a third material, wherein said first material has a lower impedance than said second material, and wherein said second material has a lower impedance than said third material.

10. The battery pack short circuit management system of claim 1, wherein said arc suppression system further comprises an electrically non-conductive isolation structure, wherein said first fusible interconnect is located within said electrically non-conductive isolation structure.

11. The battery pack short circuit management system of claim 10, wherein said arc suppression system further comprises a second electrically non-conductive isolation structure, wherein said second fusible interconnect is located within said second electrically non-conductive isolation structure.

12. The battery pack short circuit management system of claim 10, wherein said electrically non-conductive isolation structure is comprised of a non-conductive material that is applied to said first fusible interconnect.

13. The battery pack short circuit management system of claim 12, wherein said non-conductive material is selected from the group consisting of epoxies, adhesives and potting compounds.

14. The battery pack short circuit management system of claim 1, wherein said arc suppression system further comprises a capacitor connected in parallel with said first fusible interconnect.

15. The battery pack short circuit management system of claim 1, wherein said arc suppression system further comprises a first capacitor connected in parallel with said first fusible interconnect and a second capacitor connected in parallel with said second fusible interconnect.

16. The battery pack short circuit management system of claim 1, wherein said arc suppression system further comprises a combination of a thyristor connected in series with a positive temperature coefficient (PTC) element, wherein said combination is connected in parallel with said first fusible interconnect.

17. The battery pack short circuit management system of claim 1, wherein said arc suppression system further comprises:
   a first combination of a first thyristor connected in series with a first positive temperature coefficient (PTC) element, wherein said first combination is connected in parallel with said first fusible interconnect; and
   a second combination of a second thyristor connected in series with a second PTC element, wherein said second combination is connected in parallel with said second fusible interconnect.

18. The battery pack short circuit management system of claim 1, wherein said arc suppression system further comprises a permanent magnet mounted in a position adjacent to said first fusible interconnect.

19. The battery pack short circuit management system of claim 1, wherein said arc suppression system further comprises a first permanent magnet mounted in a position adjacent to said first fusible interconnect and a second permanent magnet mounted in a position adjacent to said second fusible interconnect.

20. The battery pack short circuit management system of claim 1, wherein said collector plate further comprises a contact region to which said first fusible interconnect is attached, wherein said contact region extends away from said collector plate, and wherein said contact region is thinner than a remainder of said collector plate.

21. The battery pack short circuit management system of claim 1, further comprising an electrically non-conductive, thermally insulating isolation structure separating said first cell from said plurality of cells other than said first cell.

22. The battery pack short circuit management system of claim 1, wherein each of said first plurality of fusible interconnects has a first impedance, wherein each of said second plurality of fusible interconnects has a second impedance, wherein said first fusible interconnect has a third impedance, wherein said third impedance is lower than said first impedance and lower than said second impedance, wherein said second fusible interconnect has a fourth impedance, wherein said fourth impedance is lower than said first impedance and lower than said second impedance.

23. The battery pack short circuit management system of claim 22, wherein said third impedance and said fourth impedance are substantially the same, and wherein said arc suppression system corresponds to both said first and second fusible interconnects.

24. The battery pack short circuit management system of claim 22, wherein said third impedance is lower than said fourth impedance, and wherein said arc suppression system corresponds to said first fusible interconnect.

25. The battery pack short circuit management system of claim 22, wherein said arc suppression system further comprises a contact block separate from said first collector plate and said first terminal of said first cell, wherein said first fusible interconnect electrically connects said first terminal of said first cell to said contact block and wherein a secondary fusible interconnect electrically connects said contact block to said first collector plate, wherein said secondary fusible interconnect has a fifth impedance, and wherein said fifth impedance is lower than said third impedance.

26. The battery pack short circuit management system of claim 22, wherein said arc suppression system further comprises:
   a first contact block separate from said first collector plate and said first terminal of said first cell, wherein said first fusible interconnect electrically connects said first terminal of said first cell to said first contact block and wherein a first secondary fusible interconnect electrically connects said first contact block to said first collector plate, wherein said first secondary fusible interconnect has a fifth impedance, and wherein said fifth impedance is lower than said third impedance; and
   a second contact block separate from said second collector plate and said second terminal of said first cell, wherein said second fusible interconnect electrically connects said second terminal of said first cell to said second contact block and wherein a second secondary fusible interconnect electrically connects said second contact block to said second collector plate, wherein said second secondary fusible interconnect has a sixth impedance, and wherein said sixth impedance is lower than said fourth impedance.

27. The battery pack short circuit management system of claim 22, wherein said first impedance and said second impedance are substantially the same.

* * * * *

Disclaimer

8,133,608 B2 — Weston A. Hermann, Palo Alto, CA (US) et. al. BATTERY PACK WITH CELL-LEVEL FUSING. Patent dated March 13, 2012. Disclaimer filed October 22, 2014, by the assignee, Tesla Motors, Inc.

Hereby disclaims the term of this patent and shall not extend beyond the expiration date of Patent No. 8,133,287.

(*Official Gazette, December 9, 2014*)